(12) United States Patent
Moon et al.

(10) Patent No.: US 9,319,583 B2
(45) Date of Patent: Apr. 19, 2016

(54) CAMERA DEVICE AND METHODS FOR AIDING USERS IN USE THEREOF

(71) Applicant: Samsung Electronics Co., Ltd., Gyeonggi-do (KR)

(72) Inventors: Kyungchun Moon, Gyeonggi-do (KR); Taekeun Oh, Seoul (KR); Woonggyu Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 20 days.

(21) Appl. No.: 13/886,711

(22) Filed: May 3, 2013

(65) Prior Publication Data

US 2014/0049652 A1 Feb. 20, 2014

(30) Foreign Application Priority Data

Aug. 17, 2012 (KR) .......................... 10-2012-0090002

(51) Int. Cl.
*H04N 5/222* (2006.01)
*H04N 5/232* (2006.01)
*H04N 9/82* (2006.01)
*H04N 9/87* (2006.01)
*H04N 101/00* (2006.01)

(52) U.S. Cl.
CPC ......... *H04N 5/23229* (2013.01); *H04N 9/8233* (2013.01); *H04N 9/8715* (2013.01); *H04N 2101/00* (2013.01)

(58) Field of Classification Search
USPC ....................................................... 348/207.1
See application file for complete search history.

(56) References Cited

U.S. PATENT DOCUMENTS

| | | | |
|---|---|---|---|
| 6,301,440 B1 | 10/2001 | Bolle et al. | |
| 2004/0064338 A1* | 4/2004 | Shiota et al. | 705/1 |
| 2004/0109063 A1* | 6/2004 | Kusaka et al. | 348/207.1 |
| 2004/0174434 A1 | 9/2004 | Walker et al. | |
| 2005/0128316 A1* | 6/2005 | Sugimori | 348/223.1 |
| 2006/0158534 A1* | 7/2006 | Gotohda | 348/239 |
| 2007/0236581 A1 | 10/2007 | Uchiyama et al. | |
| 2009/0115855 A1 | 5/2009 | Gotoh et al. | |
| 2009/0244324 A1 | 10/2009 | Saito et al. | |
| 2009/0268058 A1 | 10/2009 | Hwang et al. | |
| 2011/0069179 A1* | 3/2011 | Bathiche et al. | 348/207.1 |
| 2011/0292246 A1* | 12/2011 | Brunner | 348/231.99 |
| 2012/0092515 A1 | 4/2012 | Yim et al. | |
| 2012/0113272 A1 | 5/2012 | Hata | |
| 2012/0249840 A1* | 10/2012 | Hirata | H04N 348/239 |

FOREIGN PATENT DOCUMENTS

| | | |
|---|---|---|
| EP | 1 058 450 A1 | 12/2000 |
| JP | 2009-239397 A | 10/2009 |

(Continued)

*Primary Examiner* — Roberto Velez
*Assistant Examiner* — Stephen Coleman
(74) *Attorney, Agent, or Firm* — Cha & Reiter, LLC

(57) ABSTRACT

Provided are a method of controlling photographing in a camera device such as a portable terminal, which automatically sets a photographing mode using at least one of location information of the device and subject information, and a camera device thereof. A camera captures an image during a photographing mode of the device. A controller acquires meta data corresponding to the image based on at least one of the location information and subject information included in the image. A camera setting value is determined based on the acquired meta data, and the camera is automatically set according to the determined camera setting value.

22 Claims, 10 Drawing Sheets

(56) References Cited

FOREIGN PATENT DOCUMENTS

| JP | 2011-078008 A | 4/2011 |
|----|---------------|--------|
| KR | 10-2009-0114101 A | 11/2009 |
| KR | 10-1016639 B1 | 2/2011 |
| KR | 10-2012-0026702 A | 3/2012 |
| KR | 10-2012-0032336 A | 4/2012 |

* cited by examiner

FIG. 9
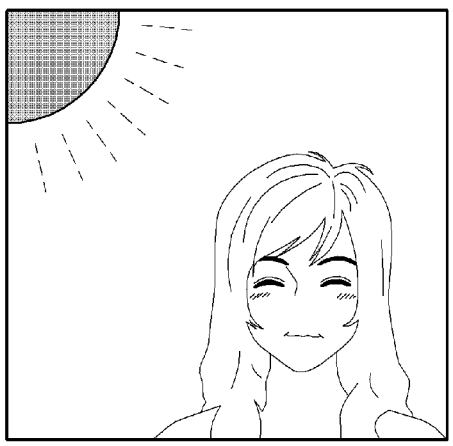
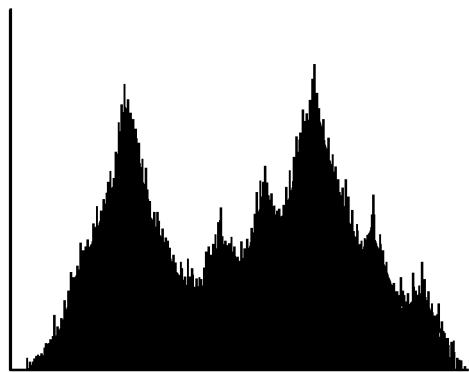
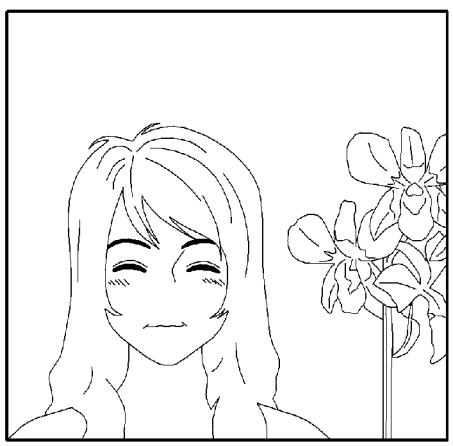
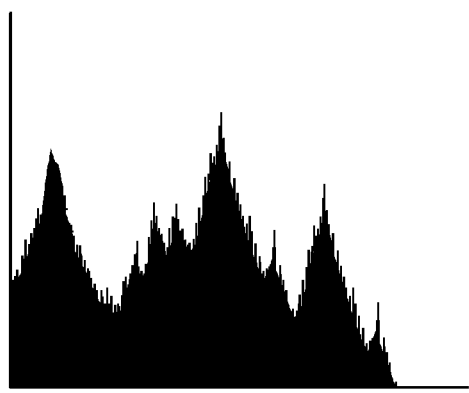

CAMERA DEVICE AND METHODS FOR AIDING USERS IN USE THEREOF

CLAIM OF PRIORITY

This application claims the benefit under 35 U.S.C. §119 (a) of a Korean patent application filed on Aug. 17, 2012 in the Korean Intellectual Property Office and assigned Ser. No. 10-2012-0090002, the entire disclosure of which is hereby incorporated by reference.

BACKGROUND

1. Technical Field

The present disclosure relates generally to electronic devices that include a camera function, and methods for facilitating their use.

2. Description of the Related Art

In recent years, with the progress of photographing technology in cameras, various photographing modes and functions have been provided that allow users to take higher quality and more realistic photographs. A photographing mode of a camera (or smart phone including a camera) may include options to set parameters such as shutter speed, aperture, IOS, and various filters.

However, an untalented or inexperienced camera user is often unaware of what various types of photographing modes mean or how to properly use or change a photographing mode. For these users, the provision of the various modes goes to waste, or they even make use of the camera more difficult. A general camera provides a function of determining a camera state manually set by the user, to automatically set a photographing mode but does not provide a function of automatically setting a photographing mode that a user requires under certain conditions.

Accordingly, there is inconvenience in that a user proficient in the use of the camera is required to always manually set the photographing mode to take a high quality photo.

As described above, current camera devices provide a camera function with various photographing modes, but the typical user cannot properly use these photographing modes, and is thus unable to take advantage of the advanced features to take high quality photographs.

SUMMARY

Disclosed is a method of controlling photographing in a device, determining a photographing mode of a camera using location information and subject information, and a device thereof.

Disclosed is a method of controlling photographing in a device such as a portable terminal, which automatically sets a photographing mode using at least one of location information of the device and subject information. A camera of the device captures an image during a photographing mode of the device. A controller acquires meta data corresponding to the image based on at least one of the location information and subject information included in the image. A camera setting value is determined based on the acquired meta data, and the camera is automatically set according to the determined camera setting value.

The device may further include a communication unit to perform data communication, where the controller transmits at least one of the location information and the subject information to a server. The meta data may be received from the server. The meta data may include a camera setting value with respect to a reference image corresponding to at least one of the location information and the subject information.

In another embodiment, the device further includes a memory storing at least one image associated with meta data including a camera setting value of the at least one image, where the controller searches an image corresponding to at least one of the location information and the subject information from the memory, and acquires the meta data of the corresponding image when the corresponding image is included in the memory as the search result.

Also disclosed is a method operable in a server. For each of a plurality of locations, a plurality of reference images containing subjects associated with each location are stored, along with meta data associated with each reference image. A captured image is received from a camera device, along with location information of the camera device and subject information of the captured image. The received image and subject information thereof are compared with reference images associated with the camera device location, to obtain a matching reference image. Meta data associated with the matching reference image is transmitted to the camera device.

BRIEF DESCRIPTION OF THE DRAWINGS

The objects, features and advantages of the present invention will be more apparent from the following detailed description in conjunction with the accompanying drawings, in which:

FIG. 9 is a diagram illustrating an example of determining photographing composition information using a histogram.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A camera device in accordance with the invention is capable of controlling a photography mode thereof. Such control may facilitate a user's operation of the device and improve the quality of the photographs taken. A camera device in accordance with the invention can be any electronic device that includes a camera, a controller, and at least some data reception capability. A camera device can be a portable camera or a portable ("mobile") terminal. Examples of portable terminals include but are not limited to a smart phones, cell phones, a Personal Digital Assistants (PDAs), Portable Multimedia Player (PMP) terminals, notebook computers, Note Pads, Wibro terminals, tablets (also called "tablet PCs"), and smart TVs.

Figure 1:
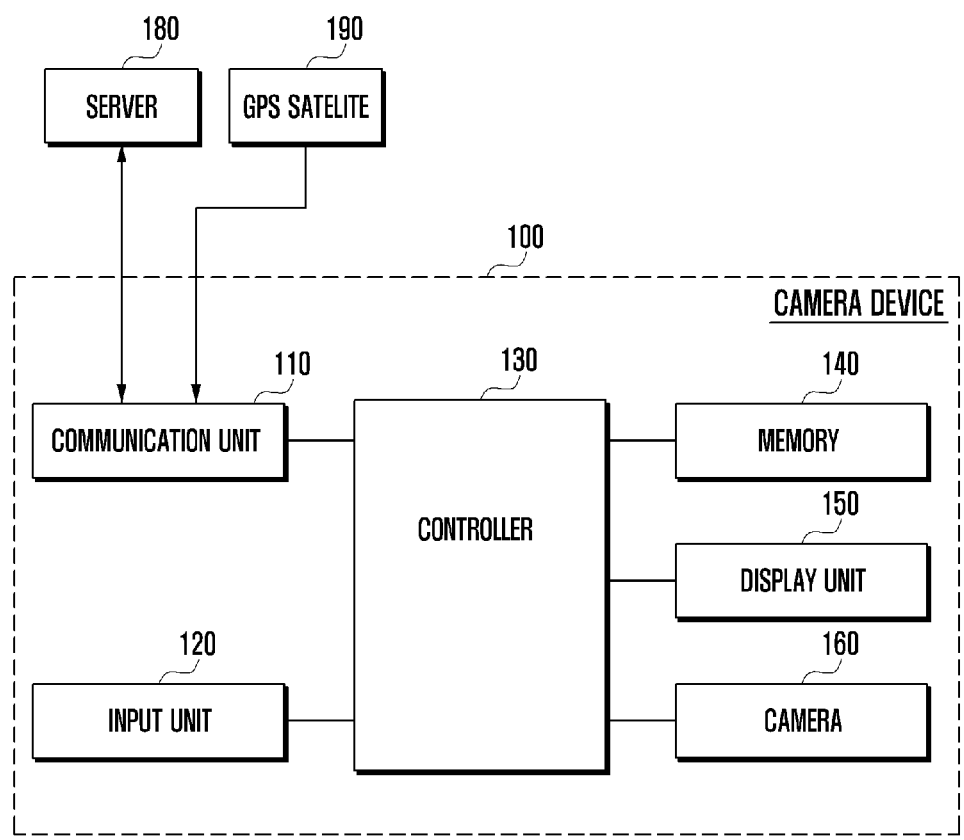
FIG. 1 is a block diagram illustrating a configuration of a camera device according to an exemplary embodiment of the present invention.

FIG. 1 is a block diagram illustrating a configuration of a camera device, 100, according to an exemplary embodiment of the present invention. As shown, device 100 includes a communication unit 110, an input unit 120, a controller 130, a display unit 150, a memory 140, and a camera 160.

The communication unit 110 may include a wired/wireless communication module, and may perform data communication with a server 180 or other portable devices using a wired or wireless communication technology. The communication module may be configured to support any suitable protocol, such as Wireless LAN (WLAN)(Wi-Fi), Wireless broadband (Wibro), World Interoperability for Microwave Access (Wimax), or High Speed Downlink Packet Access (HSDPA), 3G or LTE may be used as a wireless communication technology. Bluetooth, Radio Frequency Identification (RFID), infrared Data Association (IrDA), Ultra Wideband (UWB), ZigBee and Near Field Communication (NFC) are examples of protocols that may be used as a wireless near field communication technology. Universal Serial Bus (USB), IEEE 1394, or thunderbolt (developed by Intel corporation) may be used as a wired near field communication technology.

The communication unit 110 may include a location information module, and the location information module may perform wireless communication with a service provider to receive location information and current time information of the device 100. For example, the location information module can include a Global Position System (GPS) module to receive location information from a GPS satellite 190.

In an embodiment of the present invention, the communication unit 110 may transmit at least one of location information of the device 100 and information about a subject in an image captured by the camera 160 to a server 180 or to other communication devices. (In the description hereafter, all communication by the device 100 to obtain photography related information will be described with reference to the server 180. However, it is understood that other portable devices could alternatively provide such information in a point to point or networked data communication.) The communication unit 110 may receive a reference image(s) corresponding to the device's location information or to the subject information, from the server 180. In addition, the communication unit 110 may receive meta data from the server, which includes a camera setting value with respect to the captured image. As will be explained later, this meta data can be used by the device 100 to automatically set camera parameters to enable the taking a high quality photo, or to help guide a user to capture a better image.

In embodiments of the present invention, the communication unit 110 may transmit at least one of an image of a subject photographed by the camera 160 and meta data associated with the image to the server 180. The server may then store the images and meta data on behalf of the user, and/or use the images to expand its database.

The input unit 120 generates an operation signal according to a user input. The input unit 120 may be configured by a key pad, a dome switch, a jog wheel, or a jog switch.

The input unit 120 may include a touch sensor. For example, the touch sensor may have the form of a touch film, a touch sheet, and a touch pad. The touch sensor may detect touch input and transfer the detected touch input to the controller 130. The controller 130 may analyze a touch signal to perform an operation corresponding to the analyzed touch signal. Information corresponding to the detected touch signal may be displayed on the display unit 150. The touch sensor may receive an operation signal according to touch input of the user by various input means. The touch sensor may receive an operation signal according to a body of the user (e.g., hand) or a physical tool, a stylus pen, and an operation button which may be included in the stylus pen. The touch sensor may detect direct touch and approximate input within a predetermined distance according to an implementation scheme.

The input unit 120 achieves a layer structure with the display unit 150 and may operate as an input screen. For example, the input unit 120 may include an input page having the touch sensor and may be configured by a Touch Screen Panel (TSP) connected to the display unit 150.

In embodiments of the present invention, the input unit 120 may receive a user request to enter a photographing mode or a user request for photographing a subject in the photographing mode to generate an image. In certain examples herein, "photographing mode" refers to a mode in which auxiliary photography aide functions are carried out in accordance with embodiments of the invention. These may include the provision of meta data for subjects being imaged, automatic setting of camera settings in accordance with a detected location or a detected subject, and/or guided assistance to the user. Note that the input unit 120 may also receive a camera setting value manually input by the user.

The controller 130 controls respective constituent elements for an overall operation of the camera device 100. For example, the controller 130 may acquire meta data for determining a photographing mode based on location information and subject information of the device 100, and determine the photographing mode based on the meta data to automatically set camera settings in the photographing mode.

In embodiments of the present invention, the controller 130 may acquire meta data including camera setting information based on at least one of the location information and subject information included in a captured image, and determine a camera setting value based on the acquired meta data. The controller 130 may automatically set the camera 160 according to the determined camera setting value.

In embodiments of the present invention, the controller 130 may compute a desired image composition for determining a position of a subject in an image captured by the camera 160 based on the meta data. Based on the computed composition, controller 130 may control the display unit 150 to display at least one indicator among a sub-image, an icon, and text to guide a user in moving the camera in a computed direction. The indicator(s) may be displayed superimposed with the currently captured image Detailed exemplary operations of the controller 130 will be described further below.

The memory 140 may store programs or commands for the device 100, which are executed by controller 130 The memory 140 may include a storage medium having at least one type of a flash memory type, a hard disk type, a multimedia card micro type, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), or a Programmable Read-Only Memory (PROM).

In embodiments of the present invention, the memory 140 stores an image associated with meta data, where the meta data includes a camera setting value for that image. The image stored in the memory is a reference image by the device 100 or a captured image by the camera 160. The memory 140 may store a meta data table according to camera setting of the user.

The display unit 150 displays (outputs) information processed by the device 100. For example, the display unit 150 may display a User Interface (UI) (e.g., a Graphic User Interface (GUI)) associated with voice detection, situation recognition, and function control.

The display unit 150 may include at least one of a liquid crystal display (LCD), a thin film transistor-liquid crystal display (TFT LCD), an organic light-emitting diode (OLED), a flexible display, and a three-dimensional (3D) display.

The display unit 150 achieves a layer structure with the touch sensor configuring the input unit 120 and may operate as the input screen. In this case, the display unit 150 operating as the touch screen may perform a function of an input device.

In embodiments of the present invention, the display unit 150 may display an image of a subject photographed by the camera 160 and an image generated according to a photographing request (where a "photographing request" corresponds to the user "taking a picture" by operating the camera's shutter through a shutter button or touching an icon on the display). The display unit 150 may display a camera setting value determined by the controller and a guide for a camera moving direction according to a desired image composition computed by the controller 130 together with the image.

The camera 160 captures an image including at least one subject, converts the captured image into a data signal, and transfers the data signal to the controller 130. The camera 160 transfers the captured image to the display unit 150 as a preview screen so that the user may confirm an image viewed through the camera. The camera 160 may photograph an image captured at a photographing execution request time point according to a photographing execution request to generate image data. Herein, an image thus photographed due to photographing execution request by the user is referred to as a "generated image," a "finally captured" image or as a "photographic image". The image generated by the camera 160 may be temporarily or permanently stored in the memory 140. The camera 160 may store a camera setting value associated with the generated image at a time point when the photographing execution request is generated, as meta data. In this manner, when the generated image is viewed at a subsequent time, camera setting(s) that resulted in the generated image can be readily ascertained.

Figure 2:
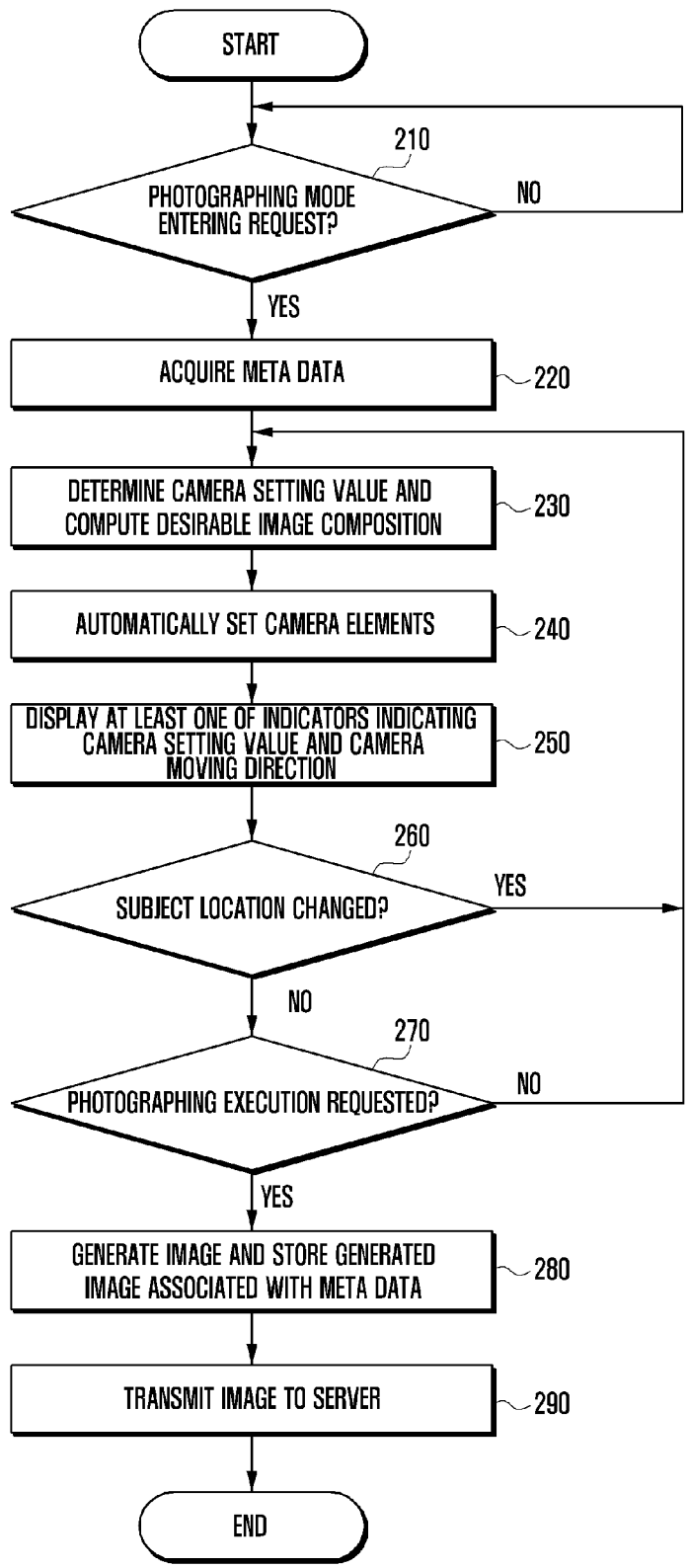
FIG. 2 is a flowchart illustrating a method of controlling photographing in a camera device according to an exemplary embodiment of the present invention.

FIG. 2 is a flowchart illustrating a method of controlling photographing in a camera device according to an exemplary embodiment of the present invention.

At the outset of the method, a camera device 100 determines whether a photographing mode entering request is generated (step 210). In this example, the photographic mode is one designed to aid a user of the camera device in accordance with the invention. For instance, the photographic mode may be set by default, or selected by the user from a suitable settings menu, or in response to a prompt, or the like. Further, the device 100 may determine whether the photographing mode entering request is generated by executing an application, a program, or a service including a camera function.

When the photographing mode entering request is generated, the device 100 may enter a photographing mode to capture an image through the camera. The image may include at least one subject such as an object, a person, a tree, or a building according to a pointing location of the camera. The captured image may be displayed as a preview image.

At this point, at step 220, device 100 may acquire meta data associated with an image to be finally captured. Prior to describing example use for such meta data in the ensuing operations of the method of FIG. 2, several exemplary methods for obtaining such meta data at step 220 will now be described in reference to FIGS. 3-7.

Figure 3:
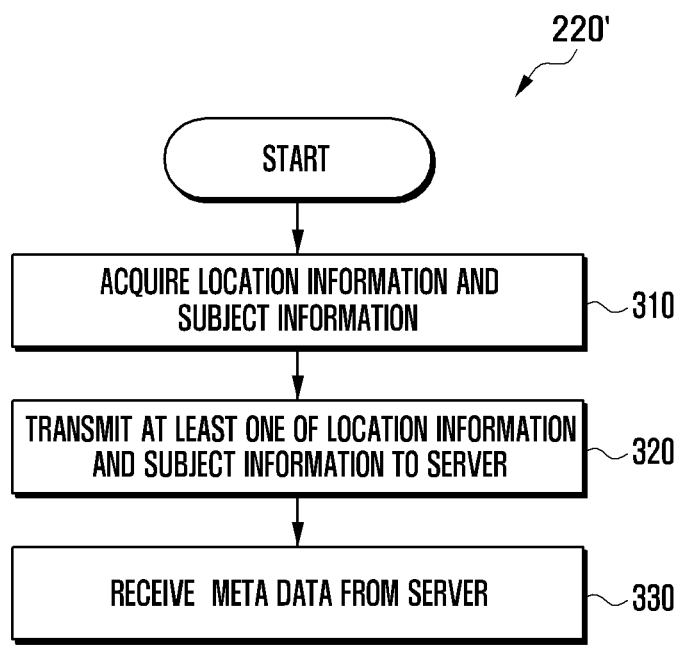
FIG. 3 is a flowchart illustrating an example method of acquiring meta data.

FIG. 3 is a flow chart illustrating a first sub-process 220' for acquiring meta data at step 220 of the method of FIG. 2. At step 310, location information of the camera device 100's location and/or subject information included in the currently captured image is acquired. To this end, location information may be acquired regarding the latitude and the longitude with respect to the camera device's current location from a GPS satellite 190 or a server (which could also be the same server 180 with which the device 100 performs data communication). The device 100 may acquire information regarding a subject in an image from the server based on the location information of the device 100, a pointing direction of the camera, a shape, the size, and a ratio of a subject included in the image. Although not illustrated, the device 100 may further include a compass to determine pointing direction and a gyroscope to determine tilt. These directional parameters may then be used to determine the camera's pointing direction.

Figure 4:
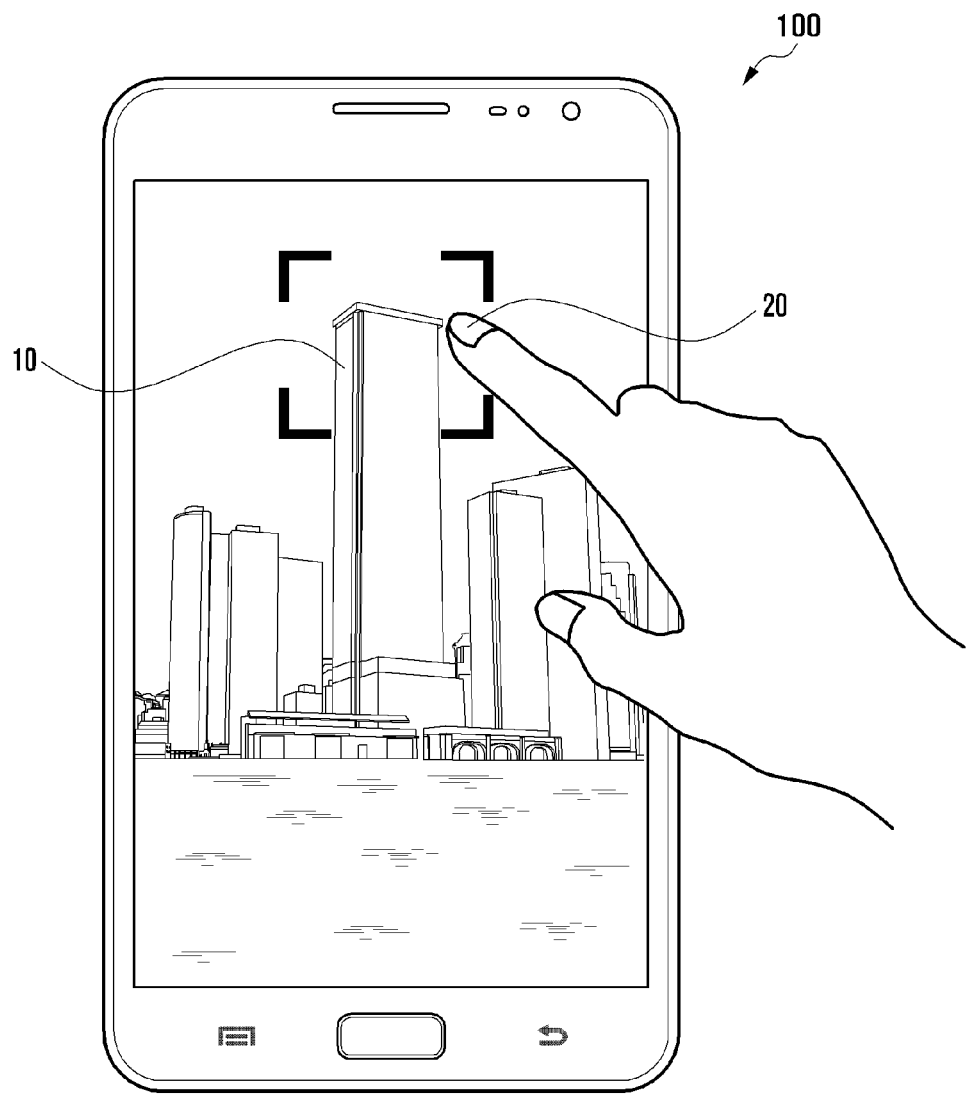
FIG. 4 is a diagram illustrating an example of selecting a subject.

Referring momentarily to FIG. 4, a screen example is shown which illustrates one way to acquire subject information within a captured image. Device 100 may receive a user selection of a specific subject from at least one subject existing in an image. For example, device 100 may detect touch input or approximate input of the user and determine a subject 10 selected corresponding to a location in which an input is detected in the image. In this case, device 100 may automatically control a camera focus value to focus the selected subject 10. In addition, device 100 may acquire information of the selected subject. For example, information that may be acquired may includes a title of the subject, the subject's location, touring information (if applicable), history, and geography related to the subject. The acquired information of the subject may be displayed together with a preview image. In the example of FIG. 4, a tall building is selected, for which meta data may have been pre-stored in a server 180. As explained below, the server can transmit the meta data for the selected subject to device 100.

In various embodiments, camera device 100 may acquire the meta data based on at least one of the location information and the subject information. The meta data may include a camera setting value, and the camera setting value may include at least one of an exposure value, a shutter speed value, use or non-use of a flash, a white balance control value, a gamma compensation value, an aperture size, and an IOS sensitivity value. With continued reference to FIG. 3, once location information and/or subject information is acquired at step 310, device 100 may transmit at least one of the location information and the subject information to the server (320). For instance, the subject information may be transmitted by transmitting the actual image captured by device 100 along with pixel coordinate information corresponding to the user's subject selection.

The server having received at least one of the location information and the subject information from the device 100 may search for a reference image corresponding to the received information, and obtain meta data of the reference image. That is, the server 180 may maintain a database of reference images associated with each location, and in particular, popular images of landmarks and the like. Thus when the server receives the device 100's location information, the captured image, and the subject information, the server may search the reference images for a match. A matching reference image is one containing the subject information in at least a portion thereof. Alternatively, the server may search reference images containing a similar subject to the one selected. The reference images may be images previously designated as popular by the server entity or by other users. When a matching reference image is obtained as a result of the search, the server may determine a camera setting value with respect to the matching reference image or acquire meta data of the matching reference image including the camera setting value. When there are two or more matching reference images, the server may compute an average with respect to the camera setting value of the images, or select a camera setting value having the greatest frequency among three or more matching reference images to acquire the camera setting value.

Next, device 100 may receive the meta data acquired from the server (330). As explained above, this meta data may include a camera setting value with respect to a previously taken reference image in the server's database corresponding to at least one of the location information and the subject information.

Figure 5:
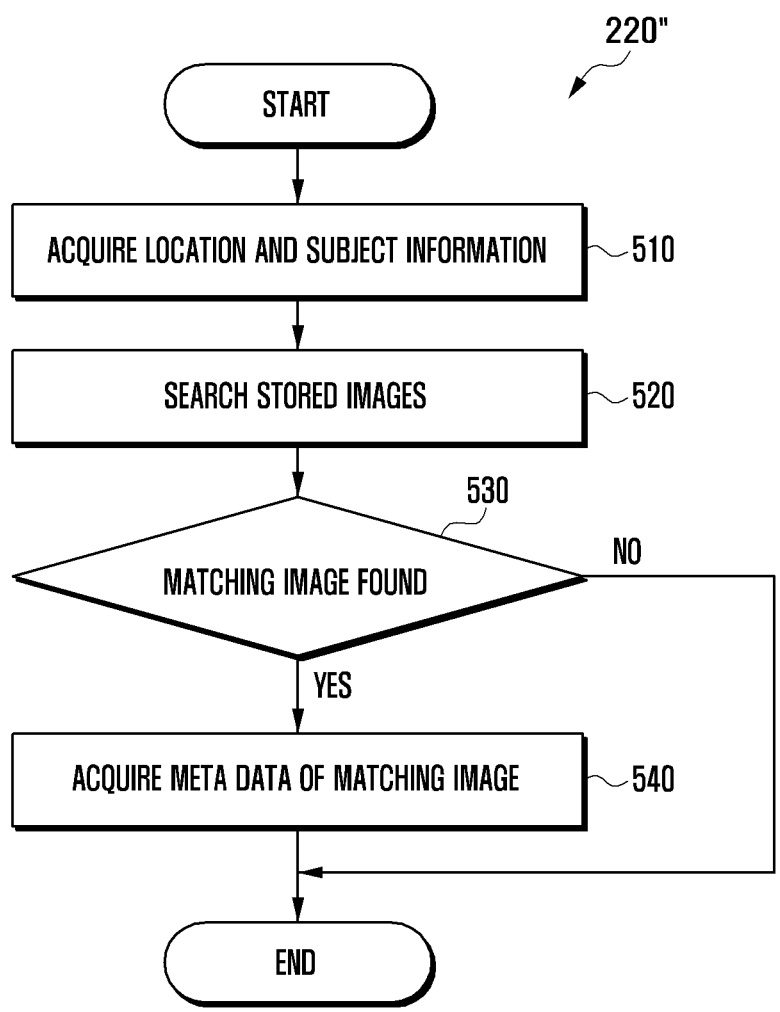
FIG. 5 is a flowchart illustrating another example method of acquiring meta data.

FIG. 5 is a flowchart illustrating another exemplary method 220" of acquiring meta data for the step 220 of FIG. 2. In this embodiment, device 100 firstly acquire location information and subject information (510) e.g., using any of the corresponding techniques described above. Next, the device 100 searches stored images (520). That is, device 100 may search for a stored image in its own memory, as a reference image which matches the currently captured image and subject information, in a similar manner as is done by the server in the embodiment described earlier. For instance, the device 100 may search for an image of a subject photographed in a corresponding location or an image photographing a similar subject to the one selected in the currently captured image. The stored images may be images of a subject previously photographed by the device 100 or images that were previously downloaded to the device from external sources Instead of searching through the pre-stored reference images, the device 100 may receive selection of a specific image among the stored images from the user.

Figure 6:
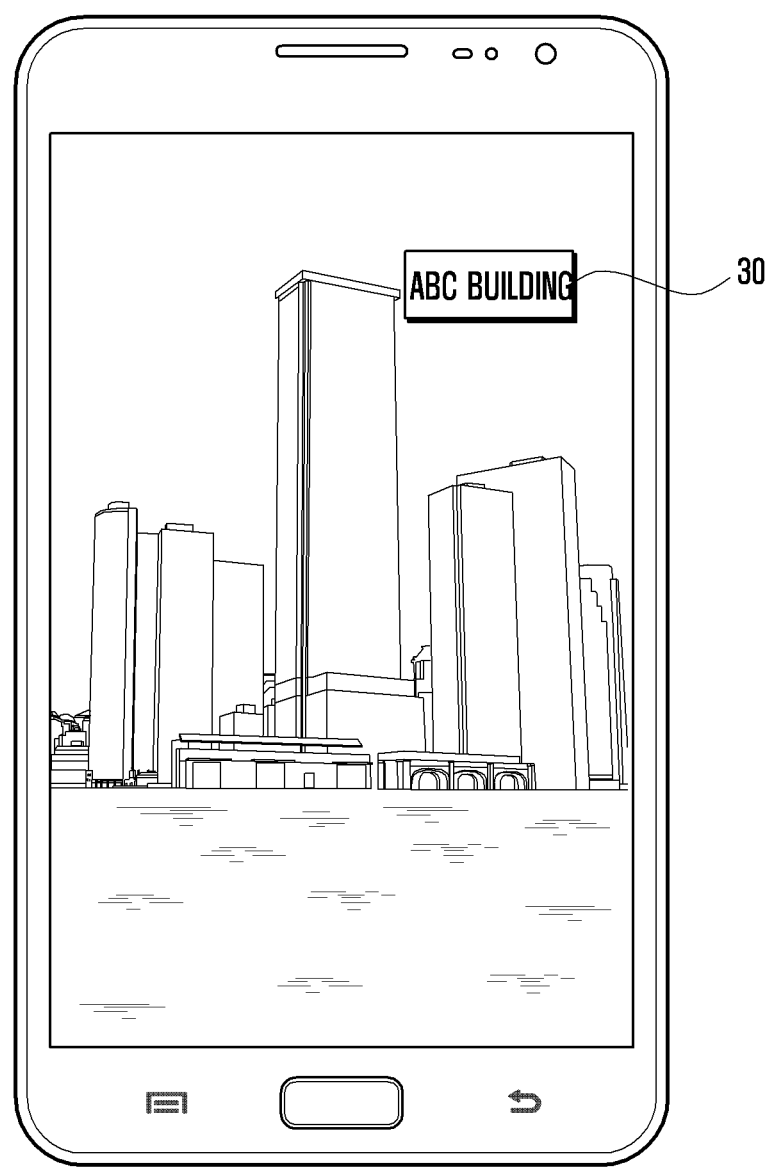
FIG. 6 is a diagram illustrating an example of an image including tagging information.

The search for a matching image at 520 can be performed using tagging information stored in association with the stored images. For example, referring to FIG. 6, at least one image stored in the device 100 may include at least one tagging information 30. The tagging information 30 can be inputted directly by the user to memorize information associated with the image or is automatically inputted by a function of a device 100 providing the tagging information. The tagging information 30 may be inputted corresponding to a specific portion of the image. In this case, the tagging information may include information about the image portion to which the tagging information 30 is inputted. In the example of FIG. 6, the image includes tagging information 30 of "ABC building" to indicate that the photographed subject of the image is the ABC building. The device 100 may acquire tagging information 30 corresponding to location information of the device 100 or subject information, which is obtained from the tagging information already stored within the device 100. Such tagging information may have been previously stored with respect to at least one matching reference image, where the tagging information is identified by matching the subject information of the currently captured image with that of the reference image.

If a matching stored image is found (step 530), then meta data of the matching image may be acquired at 540. The device 100 may acquire meta data stored associated with the matching image, and the meta data may include a camera setting value associated with the matching image. When there is no meta data stored associated with the matching image, the terminal 100 may spontaneously determine a camera setting value with the currently captured image. When there are two or more matching images, the an average may be computed of camera setting values of the matching images, or, the most frequently used camera setting value of the matching images (in the case of three or more) can be selected to acquire the camera setting value.

Figure 7:
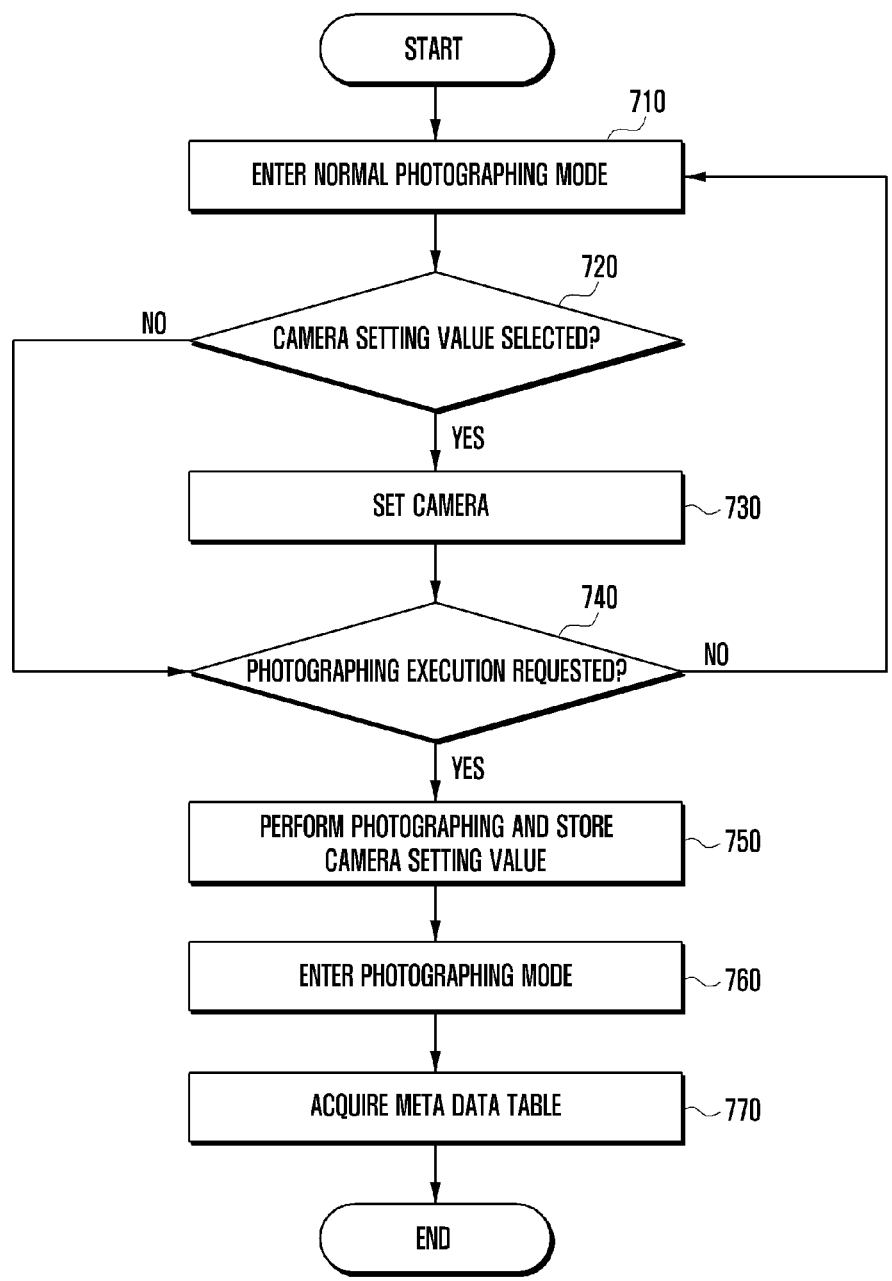
FIG. 7 is a flowchart illustrating a method of generating and storing meta data.

FIG. 7 is a flowchart illustrating a method by which meta data can be stored in association with reference images in a camera device, according to an embodiment. Once meta data is obtained for reference images via the method of FIG. 7, the meta data can be used to automatically obtain camera setting values in subsequent photo taking sessions of matching conditions, such as described above for FIG. 5. In the example method, the device 100 may firstly enter a normal photographing mode (710), which may be a camera mode in which a user doesn't obtain automatic assistance from a server or the like to set camera settings for capturing photographs The device 100 then determines whether a camera setting value is selected (720) by a user. For this step, device 100 may display a UI including a menu or an icon which allows a user to change or select a camera setting value in the photographing mode. The device 100 may receive the camera setting value through touch input or approximate input using the displayed UI. The device 100 may receive an input signal for changing or selecting a camera setting value through a button, a switch, or a jog dial included in the device 100.

If the camera setting value is selected, the device 100 may set a camera according to the selected camera setting value (730). Next, device 100 may determine whether a photographing execution is requested (740).

The device 100 may display a UI including a menu or an icon for executing a photograph. The device 100 may receive the photographic execution request through touch input or approximate input using the displayed UI. The device 100 may receive the photographing execution request through a button, a switch, or a jog dial included in the device 100.

If the photographing execution is requested, the device 100 stores the captured image (generates the image) and also stores the camera setting value in a meta data table (750) in association with the generated image.

The device 100 may store a captured image through camera 160 at the photographing execution request time point according to a photographing execution request. Device 100 may generate the photographed image as an image file and generate the image temporarily or permanently. Device 100 may display the photographed image at an optional time or until user input is detected.

The device 100 may store a camera setting value at the photographing execution request time point in the meta data table. The camera setting value may be selected by the user before the photographing execution request. The camera setting value may be set according to an automatic camera setting function provided by the device 100.

Figure 8:
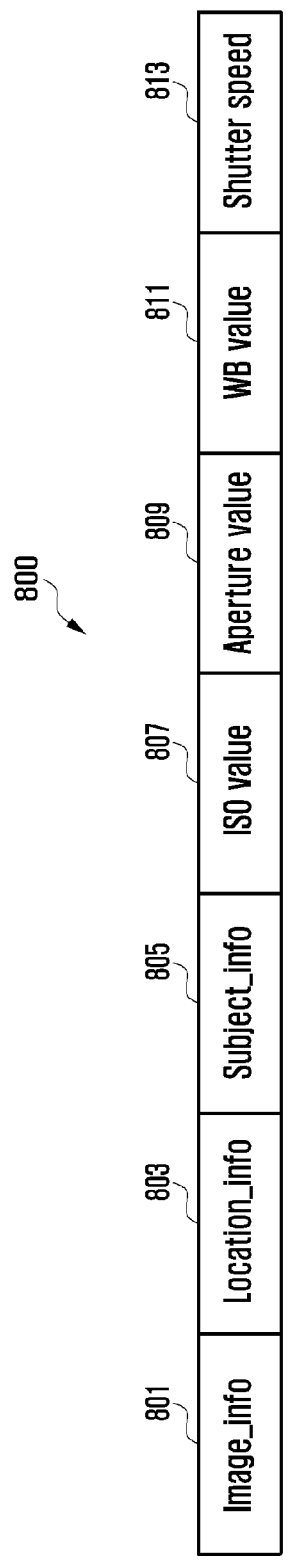
FIG. 8 is a diagram illustrating an example of a meta data table according to photographing mode setting of a user.

Referring to FIG. 8, an example meta data table 800 may include camera setting values with respect to at least one stored image. Meta data table 800 may include a preset number of camera setting values. When a new photographing execution is requested, the oldest camera setting value is removed and a new camera setting value may be stored and updated. Meta data table 800 may include International Standards Organization (ISO) sensitivity value (ISO_value) 807 corresponding to image information (image_info) 801, aperture size (aperture_value) 809, a white balance control value (WB_value) 811, and shutter speed (shutter_speed) 813. Other camera setting parameters may be additionally or alternatively stored in accordance with the invention. The meta data table may include location information (location_info) 803 with respect to an image and subject information (subject_info) 805.

Referring again to FIG. 7, the device 100 may next enter the photographing mode (760) (which is the same photographing mode as in step 210 of FIG. 2)

After performing photographing, the device 100 may reenter the photographing mode according to user input or automatically. When the photographed image is displayed, the device 100 may reenter the photographing mode when a preset time elapses so that the image is displayed.

Thereafter, the device 100 may acquire the meta data table (770), which, for example, may correspond to part of method 220″ of FIG. 5 (obtaining meta data for matching images of a currently captured image to facilitate photographing).

The device 100 may acquire the meta data table including at least one camera setting value by the user. In this case, the device 100 may acquire only camera setting values corresponding to location information of the device 100 and subject information in a stored image from the meta data table.

With continued reference to FIG. 2, once meta data is obtained at step 220 for a currently captured image using, e.g., the methods of FIG. 3 or 5, device 100 may proceed to step 230 to determine the camera setting value and compute a desirable image composition. Image composition refers to the placement or arrangement of visual elements in a photograph.

The camera setting value may be determined based on the acquired meta data, e.g., where the camera setting value is included in the meta data. Further, device 100 may automatically correct the camera setting value included in the meta data based on a camera performance, a current weather, and peripheral brightness of the device 100 to determine the camera setting value. For example, when the camera setting value is less or greater than a lower limit or an upper limit of the camera setting value of the device, the upper limit or the lower limit may be determined as the camera setting value.

Device 100 may also compute a camera setting value based on the meta data to determine the camera setting value. For instance, when an ISO sensitivity value of the camera is not included in the meta data, the an IOS sensitivity value may be computed based on a histogram of an image corresponding to the meta data, or based on other camera setting values.

The device 100 may compute the desirable image composition based on the acquired meta data. For example the terminal may compare the captured image with the acquired meta data or with the matching reference image corresponding to the meta data. Note that when the server 180 is providing the meta data, as in the FIG. 3 embodiment, the server may also transmit the matching reference image to enable the device 100 to perform further analysis for tailoring camera settings. When the meta data is derived from a reference image stored at the device 100, that reference image can be used for comparison purposes to optimize composition of the currently captured image.

When a position of a subject in a currently captured image differs from that of a subject in a reference image with as a comparison result, the device 100 may compute a moving direction of the camera to move the appearance of the subject to a position within the image designed to realize the desired composition.

One way to at least partially achieve the composition is to compute the camera composition based on a histogram. For instance, a histogram of a currently captured image can be compared to that of the reference image. The user can then be prompted to move the camera in a certain direction until the current histogram more closely matches that of the reference image. For example, referring to FIG. 9, a histogram comprising colors and brightness configuring the pixels in a photographic image containing the same subject, will change in shape according to a location of the subject or brightness of the image. As illustrated, the shape of the histogram corresponding to the top image differs from that of the bottom image, after the subject (the woman) changed position. Accordingly, if the positions of the subject are different, a histogram of the image has different shapes. The device 100 may perform an algorithm computing a moving direction of a camera according to the comparison result of the histogram to compute a composition of the camera. Besides the histogram comparison technique, other ways of computing composition in accordance with the invention are also contemplated.

With a desirable image composition computed, the device 100 may automatically set camera elements of the camera at step 240 to realize the determined camera settings. Accordingly, the device 100 may automatically set the camera at optimal camera setting values so that even unskillful users of the camera device may easily set the photographing mode of the camera.

In addition, the device 100 may display one or more indicators indicating a camera setting value and a camera moving direction (250).

Figure 10:
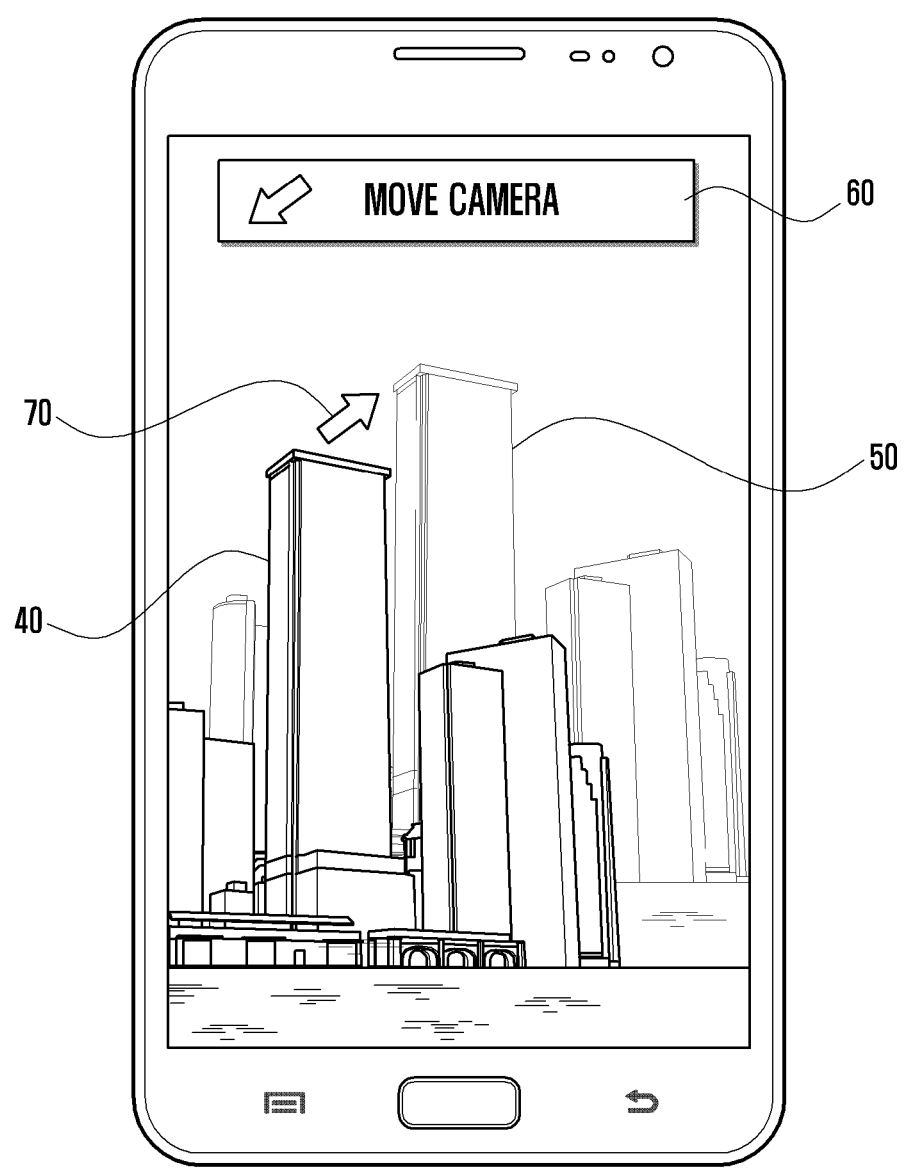
FIG. 10 is a diagram illustrating an example of guide information display according to an exemplary embodiment of the present invention.

Referring to FIG. 10, the device 100 may display a matching reference image 50 acquired to determine the camera setting value, together (e.g., superimposed) with a current image 40 captured by the camera. For instance, the image 50 may be an image selected as a "best shop" among many matching images of a popular landmark, where the best shop determination is made by a server entity or by users of other devices. That is, the best shop image is selected as a model image to be emulated. Device 100 may display the image 50 acquired to determine the camera setting value according to a fading effect (i.e., the features of image 50 are displayed less bright than those of the current image 40). The device 100 may display a camera setting value (in this case, a desired moving direction) together with the image 40 in the form of a text, a sub-image, or an icon.

An indicator may be displayed indicating a desired moving direction of the camera based on the computed desirable image composition. The indicator may include at least one of an image, an icon, or a sub-image. For example, the device 100 may display a text indicator 60 of "move camera" in the form of a pop-up together with an image indicating a direction to which the camera should be moved. The device 100 may display another image indicator 70 indicating a direction moving a subject together with a captured image to position a subject in an image at a location of the image 50 acquired to determine the camera setting value. The device 100 may output vibration and/or sound until the subject in the image is moved to the target location of the reference image.

Accordingly, when the subject's position coincides with that in the reference image 50 and the photograph is taken, the resulting generated image closely resembles that of the model image, with similar composition. As a consequence, even an untalented user of the camera device 100 is able to take a picture with composition mimicking that of a model photograph. Further, other camera settings aside from composition, such as one or more of those shown in FIG. 8, may automatically mimic those of the model image based on the meta data provided, whereby the captured image more closely resembles the model image. Moreover, the currently captured image may contain other subjects, such as a person posing at the subject landmark.

Methods of controlling photography in a camera device and a camera device thereof according to the present invention may allow an unskillful user of a camera to easily set a photographing mode the camera and to generate improved photos.

Moreover, methods of controlling photography according to the present invention can automatically set a photographing mode of a camera so that a user can take a desired picture, thereby conveniently and easily performing photographing.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A device comprising:
a camera for capturing an image of a subject;
a display unit;
a controller configured to:
acquire a reference image of the subject based on at least one of a location information of the device and the captured image
compute a moving direction of the camera by comparing a relative position of the subject within the captured image with a relative position of the subject within the reference image, the captured image and the reference image being displayed on the display unit; and
control the display unit to display the computed moving direction of the camera.

2. The device of claim 1, further comprising a memory storing at least one reference image and meta data associated with the reference image, wherein the controller determines a camera setting value based on the meta data of the reference image.

3. The device of claim 1, further comprising a memory storing a meta data table, wherein the controller stores a camera setting value at a photographing execution request time point in the meta data table when a photographing execution is requested, and determines the camera setting value based on the meta data table.

4. The device of claim 1, wherein the controller further configured to compute the moving direction of the camera by comparing a histogram of the captured image with a histogram of the reference image, each histogram being changed according to the position of the subject.

5. The device of claim 1, wherein the relative position of the subject within the captured image comprises the relative position of the subject within the captured image with a border of the captured image and wherein the relative position of the subject within the reference image comprises the relative position of the subject within the captured image with a border of the reference image.

6. The device of claim 1, wherein the relative position of the subject within the captured image comprises the relative position of the subject within the captured image with a center of the captured image and wherein the relative position of the subject within the reference image comprises the relative position of the subject within the captured image with a center of the reference image.

7. The device of claim 1, wherein the controller controls the display unit to display an indicator including at least one of a message, an icon, or a sub-image.

8. The device of claim 7, wherein the controller recomputes the moving direction when a current position of the subject is changed, and controls the display unit to display at least one indicator indicating the recomputed moving direction.

9. The device of claim 1, further comprising a memory storing at least one image along with associated meta data including a camera setting value of the at least one image,
wherein the controller captures a photographic image according to the camera setting value and controls the memory to store meta data associated with the photographic image when a photographing execution is requested.

10. The device of claim 9, further comprising a communication unit to perform data communication,
wherein the controller controls the communication unit to transmit at least one of the photographic image and the meta data associated with the photographic image to an external device.

11. The device of claim 1, wherein the controller further configured to:
acquire, based on at least one of the location information of the device and the captured image, meta data corresponding to the captured image,
determine a camera setting value based on the acquired meta data, and
automatically set the camera according to the camera setting value.

12. The device of claim 11, wherein the camera setting value comprises at least one of an exposure value, a shutter speed value, use or non-use of a flash, a white balance control value, a gamma compensation value, an aperture size, and an IOS sensitivity value.

13. The device of claim 11, wherein the controller controls the display unit to display information about the determined camera setting value together with the captured image.

14. A device comprising:
a camera for capturing an image;
a display unit for displaying the captured image;
a controller configured to acquire meta data corresponding to the captured image and a reference image including a subject information within the captured image based on at least one of a location information of the device and the subject information included in the captured image, to compute a moving direction of the camera based on the meta data and the reference image, and to control the display unit to display the computed moving direction of the camera and at least one of the reference image and captured image; and a communication unit to perform data communication, wherein the controller controls the communication unit to transmit at least one of the location information and the subject information to a server, and to receive the reference image and the meta data including a camera setting value associated with the reference image corresponding to at least one of the location information and the subject information from the server.

15. The device of claim 14, wherein the server transmits the reference image and a histogram of the reference image to the device.

16. A method of controlling photographing in a device, the method comprising:
   capturing an image;
   acquiring, based on at least one of a location information of the device and the captured image, a reference image of a subject;
   computing a moving direction of a camera by comparing a relative position of the subject within the captured image with a relative position of the subject within the reference image, the captured image and the reference image being displayed on a display unit; and
   displaying the computed moving direction of the device.

17. The method of claim 16, further comprising:
   acquiring, based on at least one of the location information of the device and the captured image, meta data corresponding to the captured image
   determining a camera setting value based on the acquired meta data; and
   automatically setting a camera according to the determined camera setting value.

18. A method of controlling photographing in a device, the method comprising:
   capturing an image of a subject;
   acquiring meta data corresponding to the captured image and a reference image including subject information within the captured image based on at least one of a location information of the device and the subject information included in the captured image;
   computing a moving direction of the device on the meta data and the reference image; and
   displaying the computed moving direction of the device and at least one of the reference image and captured image,
   wherein the acquiring the meta data comprises transmitting at least one of the location information and the subject information and receiving the meta data including a camera setting value with respect to the reference image corresponding to the location information and the subject information from a server.

19. The method of claim 18, wherein the meta data received from the server comprises the reference image, the method further comprising:
   superimposing the reference image on the captured image; and
   displaying an indicator guiding a user to move the device to a position in which a representation of the subject in the captured image coincides with a representation of the subject in the reference image.

20. A method operable in a server, comprising:
   for each of a plurality of locations, storing a plurality of reference images containing subjects associated with each location;
   storing meta data associated with each reference image;
   receiving a captured image from a camera device, along with location information of the camera device and subject information of the captured image;
   comparing the received image and subject information with reference images associated with a location of the camera device, to obtain a matching reference image; and
   transmitting the matching reference image along with the meta data associated with the matching reference image to the camera device.

21. The method of claim 20, wherein the meta data comprises at least one of an exposure value, a shutter speed value, use or non-use of a flash, a white balance control value, a gamma compensation value, an aperture size, and an IOS sensitivity value.

22. The method of claim 20, wherein the server transmits to the subject information corresponding to the location of the camera device.

* * * * *